United States Patent [19]
Dupre et al.

[11] 3,780,502
[45] Dec. 25, 1973

[54] COLLECTOR APPARATUS

[75] Inventors: George T. Dupre, Palatine; Thomas M. DeMarco, Chicago, both of Ill.

[73] Assignee: National Foundry Equipment Company, Inc., Palatine, Ill.

[22] Filed: Jan. 12, 1973

[21] Appl. No.: 323,085

Related U.S. Application Data

[63] Continuation of Ser. No. 109,246, Jan. 25, 1971, abandoned.

[52] U.S. Cl............ 55/337, 15/352, 55/17, 55/215, 55/305, 55/334, 55/341, 55/356, 55/366, 55/423, 55/425, 55/429, 55/432, 55/449
[51] Int. Cl............................................. B01d 50/00
[58] Field of Search............. 15/301, 314, 352; 55/211, 215, 304–305, 312, 315, 318, 337, 334, 341, 356, 358, 366, 423, 429, 432, 449, 465, 17; 141/312

[56] References Cited
UNITED STATES PATENTS

| | | | |
|---|---|---|---|
| 3,320,727 | 5/1967 | Farley et al........................ | 55/429 X |
| 3,608,283 | 9/1971 | Huglo................................ | 15/352 X |
| 2,372,316 | 3/1945 | Curtis................................ | 55/17 UX |
| 3,541,631 | 11/1970 | Kluge et al....................... | 15/352 X |
| 3,650,420 | 3/1972 | Mahaney......................... | 141/312 X |
| 3,554,520 | 1/1971 | Grosko............................ | 141/312 X |
| 3,485,671 | 12/1969 | Stephens......................... | 55/429 UX |
| 485,915 | 11/1892 | Duckham......................... | 55/17 |
| 3,577,705 | 5/1971 | Sharlit.............................. | 55/465 X |
| 2,276,805 | 3/1942 | Tolman............................ | 55/288 |
| 2,496,180 | 1/1950 | Smith et al...................... | 55/215 |
| 3,717,901 | 2/1973 | Johnstone....................... | 55/429 X |

Primary Examiner—Frank W. Lutter
Assistant Examiner—Vincent Gifford
Attorney—Nate F. Scarpelli

[57] ABSTRACT

An industrial heavy-duty vacuum collector suitable for use with waste material hoppers, particularly dump hoppers. The collector includes a positive displacement vacuum blower apparatus, a material separator apparatus on a base mountable in airtight relation with the hoppers and an automatic control apparatus for the collector.

11 Claims, 5 Drawing Figures

3,780,502

INVENTORS
GEORGE T. DUPRE'
THOMAS M. DEMARCO
BY Merriam, Marshall, Shapiro & Klose
ATTORNEYS INVENTORS
GEORGE T. DUPRE'
THOMAS M. DEMARCO
BY Merriam, Marshall, Shapiro & Klose
ATTORNEYS

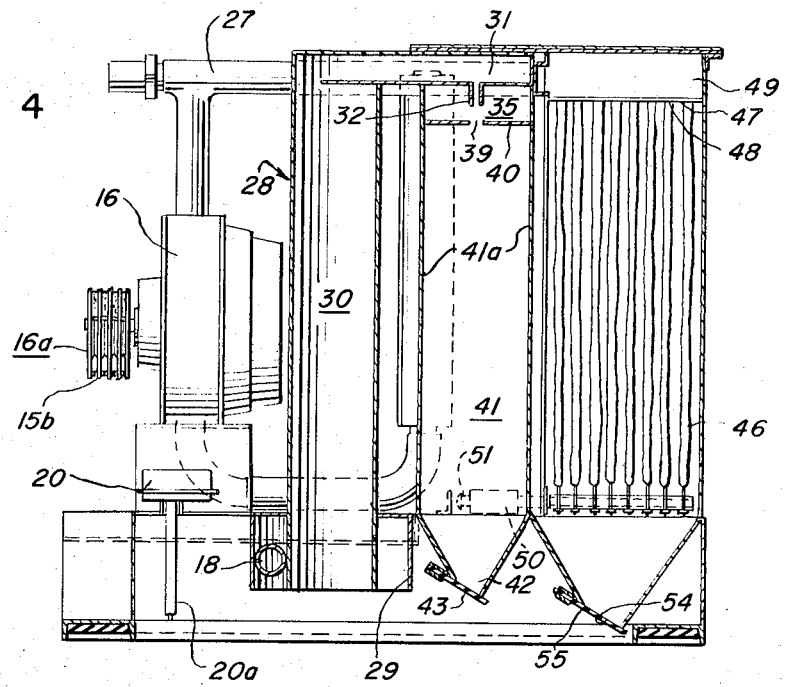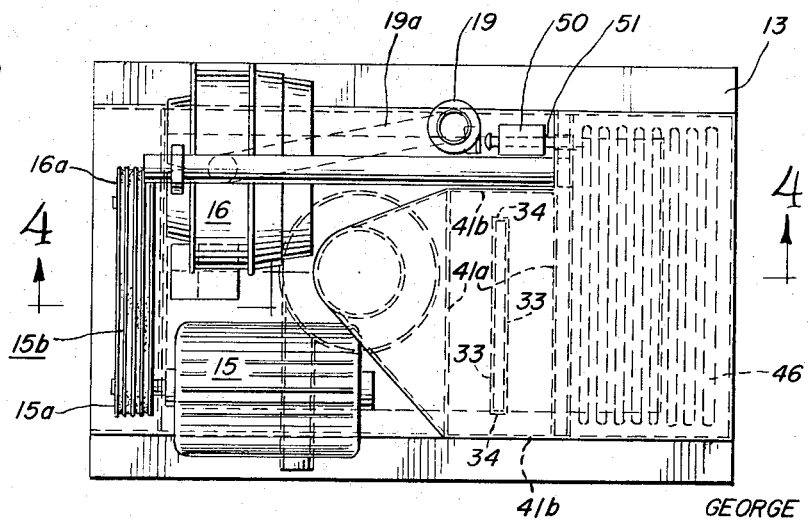

COLLECTOR APPARATUS

This is a continuation of application Ser. No. 109,246, Filed Jan. 25, 1971, now abandoned.

BACKGROUND OF THE INVENTION

This invention relates generally to improvements in apparatus for collection of dust and other wet or dry particulate waste and spillage materials at foundries and manufacturing plants and more particularly to a portable, heavy-duty, vacuum collector apparatus suitable for use with standard waste material collection hoppers, especially those of the dump hopper variety.

Operating procedures at foundries normally result in the accumulation of wet and dry sand, often admixed with metal chips from castings and metal shop spillage from cast cleaning. Efficient foundry operation requires removal of those materials. Manufacturing plants also use grinders, pneumatic chisels, wire brushes, machining tools, and other power tools and machines producing dust and particulate wastes. Such use gives rise to serious health, safety, and machine maintenance problems which can only be eliminated through continuous removal of such wastes.

Various attempts have been made to provide vacuum collector apparatus to remove dust, sand and other materials of widely varying particulate size and weight at foundries and manufacturing plants. In some instances, permanent, centralized, heavy-duty, vacuum collector installations have been employed. These incorporate multiple collector hoses and conduits which extend from the vacuum source throughout the foundry or manufacturing plant. While such permanent installations can generally be constructed in a size capable of providing good vacuum strength characteristics, the maintenance of the required extensive network of airtight, obstruction-free conduits and hoses is both costly and inefficient.

Smaller, cannister-type or bag-type vacuum collectors have been employed as an alternative to the centralized installations described above. Such small collectors are relatively portable, and their use does not entail the maintenance of a network of hoses. Inherent size limitations, however, necessitate very frequent emptying of small collectors and the restriction of their use to collection of dry, fine particulate matter. Bag-type collectors are notably unsuitable for collection of wet materials due to the likelihood of clogging of the bag fabric.

No single collection apparatus heretofore devised has been suitable for industrial use in terms of providing high vacuum strength, large capacity and portability and effective collection of wet or dry materials.

SUMMARY OF THE INVENTION

The vacuum collector apparatus of the present invention provides high vacuum strength through use of heavy duty, positive displacement, vacuum blower apparatus. Through adaptation for use in combination with standard waste material dump hoppers, the apparatus of the invention provides for collection of large quantities of waste materials. Portability of the apparatus is provided through adaptation for movement by fork lift equipment. Exceptional effectiveness in the collection of wet and dry materials is afforded through incorporation in the collector apparatus of a multistage material separator system.

The collector of the present invention generally comprises positive displacement vacuum blower apparatus and material separator apparatus on a portable base mountable in airtight relation upon standard waste material dump hoppers.

Preferred embodiments of the invention may include a cyclone-type material separator for separating out and exhausting large size particulate matter, a particulate accelerator for separating out and exhausting small size particulate matter and moisture droplets, and a multiple, flat bag filter for collection of fine particulate matter.

Also included may be a blower exhaust muffler apparatus and automatic shut-off apparatus sensitive to the volume of material collected in the hopper.

Collector apparatus constructed according to the invention is suitable for use in a variety of manners in order to meet the particular collection requirements of a given foundry or plant. For example, the collector may be moved from one dump hopper to another with the hoppers located at various sites throughout a given facility; or the collector, in combination with a hopper upon which it is mounted, may be located and relocated as a unit throughout the facility. An alternative use of the collector would include mounting it in a semi-permanent fashion upon a frame fitted with apparatus permitting repeated mounting and dismounting of the collector on one dump hopper after another, as such are supplied to and removed from the collector. Another use of the collector could include mounting it, either temporarily or permanently, on a large, permanent, bin-type hopper which would be periodically emptied.

The above-mentioned uses of the collector apparatus are facilitated by its adaptation for movement by fork-lift equipment. This is especially economically advantageous because expensive fork-lift equipment is often idle during normal clean-up periods at factories and foundries and hence not otherwise put to its most efficient use at those times.

Further aspects and advantages of the present invention will be apparent from the following description of preferred embodiment thereof, reference being made to the following drawings.

BRIEF DESCRIPTION OF THE DRAWINGS

FIG. 3 is a plan view of an embodiment of the invention.

FIG. 4 is a sectional view taken along lines 4—4 of FIG. 3; and

DESCRIPTION OF A PREFERRED EMBODIMENT

Figure 1:
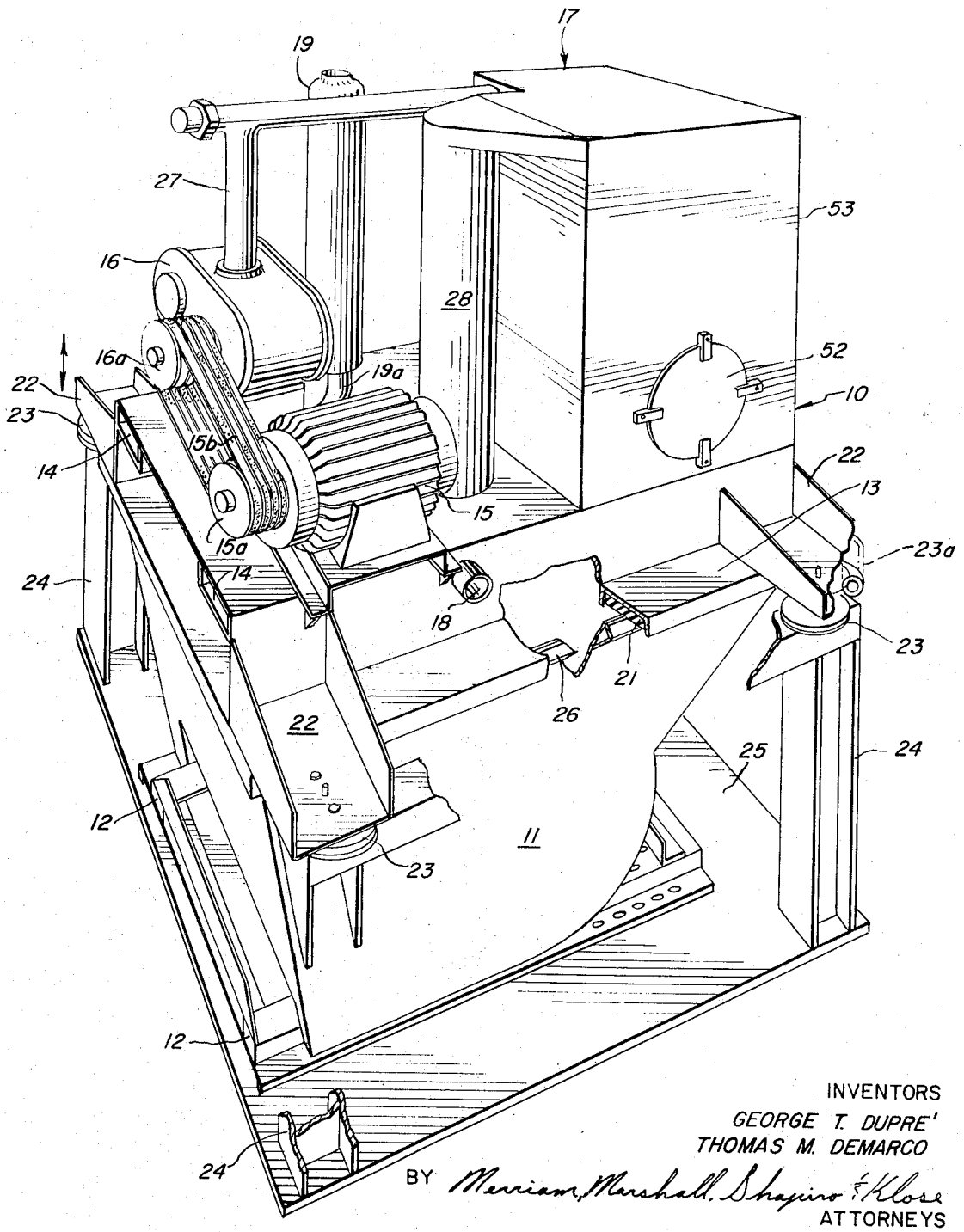
FIG. 1 is an isometric view of an embodiment of the invention showing collector apparatus mounted on a standard dump hopper, with portions cut away.

FIG. 1 shows an embodiment 10, of vacuum collector apparatus of the present invention mounted on a waste material dump hopper 11.

Hopper 11, for use in combination with the collector, may be of a construction and capacity suited for the particular requirements of a given foundry or plant. Many foundries, for example, presently use steel hoppers of 27 cubic foot capacity. Hopper 11 will ordinarily be fitted with channels 12, 12 for receiving tines of fork-lift equipment.

Collector 10 of the embodiment shown includes a platform base structure 13 of a size accommodating mounting in airtight relation upon hopper 11. Base 13 is preferably constructed of heavy guage steel and is provided with channels 14, 14 adapted to receive the tines of fork-lift equipment, accommodating movement thereby.

Mounted on base 13 is an electric motor 15 and a blower 16 which provides the vacuum source for material separator apparatus 17. Motor 15 and blower 16 may be of standard construction with a preferred motor size for most industrial purposes being about 25 horsepower, permitting development of about a 20 inch Hg vacuum. Size specifications are, of course, subject to wide variation, depending upon the particulate size and weight characteristics of the materials to be collected. Blower 16 is ordinarily connected to motor 15 by means of pulley sheaves 15a, 16a, and endless belts 15b.

Collector 10 also includes an intake tube 18, a blower exhaust muffler 19, and an automatic shut-off control apparatus 20 (FIG. 4). Automatic shut-off control 20 preferably includes a plunger switch element 20a which operates to turn off motor 15 when hopper 11 becomes filled with waste material.

Platform base 13 is provided with a gasket 21, by means of which an airtight relation is maintained between collector 10 and hopper 11. Gasket 21 is preferably constructed of gum rubber, neoprene, polyethylene, or other such resilient material. While it is most advantageous that a single gasket 21 be mounted on platform base 13, gaskets may be fitted on each dump hopper 11.

Platform base 13 may thus be mounted on a standing dump hopper 11 and moved from one hopper to another, or may be mounted in a semi-permanent manner as shown, with platform support flanges 22 supported on expandable and collapsible pneumatic bellows 23 resting on support frame elements 24 of a support base plate 25. Base plate 25 may be wheel mounted, if desired, to facilitate movement of the collector and frame as a unit without fork-lift equipment.

When pneumatic bellows 23 are expanded (as indicated in phantom lines at 23a in FIG. 1), the collector 10 is in a raised position; and an empty hopper 11 may be set in place below it. Bellows 23 may then be collapsed, lowering collector 10 to an airtight position on hopper 11 with gasket 21 abutting flange 26 of the hopper.

Upon filling of hopper 11 with collected waste material, collector 10 may again be raised to permit removal and replacement of the hopper.

If suitable for the particular purposes of the user, the automatic shut-off control 20 may be electrically connected with apparatus operating the pneumatic bellows 23 to effect automatic raising of collector 10 after filling of hopper 11 and shut-off of motor 15.

Operation of blower 16 develops a vacuum in conduit 27 leading to material separator apparatus 17 including cyclone separator 28. Evacuation of separator apparatus 17 develops a vacuum in hopper 11 and causes a suction at intake tube 18.

Operation of material separator apparatus 17 may be understood through consideration of FIGS. 2, 3 4 and 5.

For the purposes of the following discussion, the term "particulate matter," will be understood to include both solid and liquid materials as opposed to air or other gaseous materials. Wet and dry particulate material drawn in through a hose (not shown) attached to intake tube 18 will first be subjected to cyclonic separation from the airstream by cyclone separator 28.

Particulate material suspended in the airstream drawn in at intake 18 is impacted along the curving walls of base cylinder 29 of cyclone separator 28. According to well-known physical principles of heterogeneous material flow, the heaviest of waste material particles are separated from the flow of the airstream and tend to fall downward in a cyclonic path into hopper 11 while the airstream is drawn upward through cylinder 30 of cyclone separator 28 toward transverse chamber element 31.

The airstream, carrying materials not removed by cyclone separator 28, thereafter is drawn from an upper transverse chamber 31 through a vertically-extending linear accelerator nozzle 32.

Figures 2, 5:
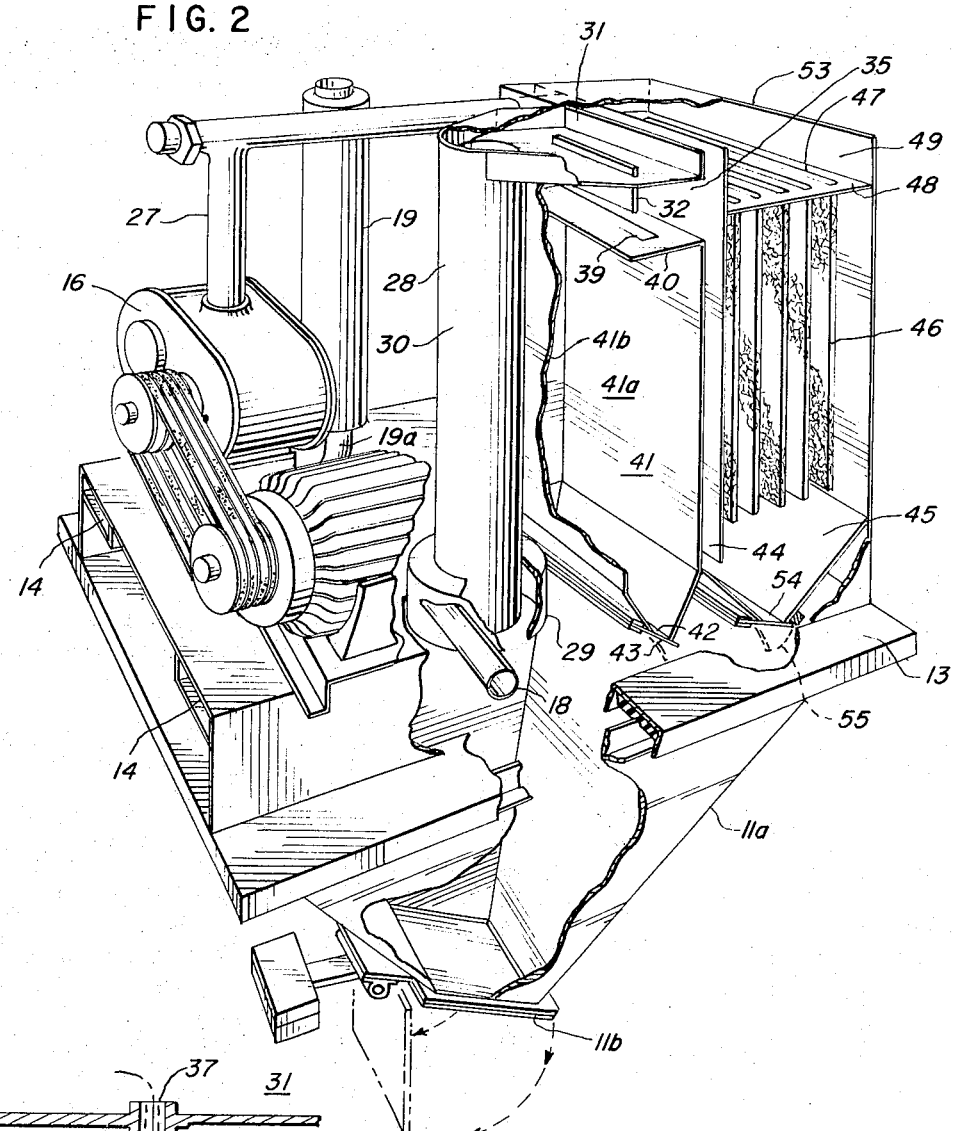
FIG. 2 is an isometric view of an embodiment of the invention showing collector apparatus mounted on a bin-type hopper, with sections cut away.
FIG. 5 is an expanded view of a portion of FIG. 4.

Referring to FIG. 5, linear accelerator nozzle 32 may be of a generally rectilinear configuration with rectangular broad side walls 33, 33 and narrow end walls 34, 34 extending from transverse chamber 31 into accelerator ante-chamber 35 and defining an open-ended, prismic accelerator passage 36 having an inlet 37 and an outlet 38.

As illustrated in FIG. 5 broad side walls 33, 33 may be provided with beveled edge portions 33a adjacent outlet 38. Narrow end walls 34, 34 may be similarly constructed.

Outlet 38 of nozzle 32 is centered directly above a rectangular orifice 39 in an accelerator chamber ceiling plate 40.

In the course of passage through accelerator nozzle 32, particulate materials in the airstream are accelerated and exit through nozzle outlet 38 at a velocity greater than their initial velocity at nozzle inlet 37. Upon exiting outlet 33, accelerated materials travel through accelerator ante-chamber 35 and enter main accelerator chamber 41 through the central portion of orifice 39.

The heaviest of the accelerated materials tend to continue in a substantially straight downward path while the airstream "backs up" within chamber 41 and exits at the edge portions of orifice 39 into antechamber 35. Th path of airstream entering chamber 41 is thus generally downward, then lateral and finally upward. Typical paths of accelerated materials and the airstream are respectively represented by dash-dot and dotted arrows in FIG. 5.

In operation, substantially the entire aristream will preferably disperse laterally and turn upwardly before reaching the bottom quarter of accelerator chamber 41, leaving that space as a waste collection area which is substantially undisturbed by the airstream.

The shapes, relative dimensions and spacial arrangement of linear accelerator nozzle 32, orifice 39 and main accelerator chamber 41 may be subject to design variations depending upon the proposed use of the collector in which such elements are employed.

If, for example, wood shavings or other materials having a rather small mass to volume ratio are to be collected, it may be advantageous to provide a linear accelerator nozzle 32 having a substantially cylindrical configuration to avoid clogging. In such a case, a circular orifice 39 would be accordingly provided.

If exceptionally finely divided wastes predominate in the materials to be collected, the ratio of nozzle length to accelerator chamber length may be adjusted to assure that chamber 41 is long enough to permit substantial turn around or back-up of the air-stream without disturbance of wastes accelerated to the collection area at the bottom of the chamber. If, on the other hand, little or no such finely divided material is to be collected, a shorter chamber length may suffice for efficient operation.

Nozzle, orifice and chamber elements suitable for use in a collector 10, designed for collection of typical foundry wastes such as wet and dry sand, gravel, shot and metal chips, would include a nozzle 32 having a broad side wall 33 with dimensions of 21 inches by four inches and a narrow end wall 34 with dimensions of one-fourth inch by four inches. A horizontal cross-section of passage 36 would accordingly be approximately one-fourth inch by 21 inches. A nozzle 32 of such dimensions would preferably be centered with outlet 38 approximately one-half inch above an orifice 39 which measured 21½ inches by three-fourths inch. A suitable main accelerator chamber would be prismic and measure approximately 27 inches along chamber walls 41a, 41a parallel to the broad side walls 33, 33 of nozzle 32 and approximately 12 inches along the walls 41b, 41b parallel to the narrow end walls 34, 34 of nozzle 32. A preferred height for main accelerator chamber 41 would be approximately 48 inches.

At the base of accelerator chamber 41 is an outlet 42 having a closure flap element 43. Flap element 43 may be a counterweighted rigid structure, as shown, or may be a simple flap of rubber or similar material. Flap 43 is maintained in a position closing outlet 42 during operation of collector 10 by the normal pressure differential between accelerator chamber 41 and hopper 11. Once motor 15 and blower 16 are shut off, normal atmospheric pressure is restored to both chamber 41 and hopper 11 and the weight of collected materials in chamber 41 will cause flap 43 to move downwardly, allowing exhaustion of collected wastes from chamber 41 through outlet 42 into hopper 11.

The airstream leaving accelerator chamber 41 through orifice 39 is drawn down vertical channel 44 and into filter chamber 45. Filter chamber 45 is preferably provided with apparatus for filtering out and collecting substantially all remaining particulate material in the airstream.

Apparatus suitable for this purpose may include a plurality of fabric, flat bag, filter elements 46. Such filter elements generally comprise a fabric bag on a frame. In operation, the airstream passes through the walls of each bag toward its interior, leaving finely divided particulate material trapped in the fabric of the bag.

After passing through the bag walls, the airstream would be drawn up through slots 47 in a filter chamber ceiling plate 48 into an exhaust chamber 49 and thereafter through exhaust conduit 27 toward blower 16. Finally, the airstream would pass from blower 16 through conduit 19a to exhaust muffler 19 and into the air.

The effectiveness of fabric bag filter elements 46 is enhanced because moisture droplets are substantially separated from the airstream upstream of the bags, in accelerator chamber 41, and thus do not remain to clog the bag fabric.

From time to time materials trapped in the fabric of bag elements 46 may be shaken loose through manual or automatic agitation. As indicated in FIGS. 3 and 4, automatic shaking of bag elements 46 may be effected through use of an electric, reciprocating piston apparatus 50 having a piston element 51 attached to the bottom portions of bag elements 46.

Access to bag elements 46 may be had through a lidded port 52 in a casing 53 enclosing material separator apparatus 17. (FIG. 1)

Materials shaken free from bag elements 46 will ordinarily fall to the base of filter chamber 45. At the base of chamber 45 is an outlet 54 and a closure flap 55 which function to exhaust waste from chamber 45 in the same manner as the outlet 42 and flap 43 function with respect to accelerator chamber 41.

Filter chamber 45 may alternately be provided with filtering apparatus, other than bag elements 46, to perform a similar function. Suitable filtering apparatus for this purpose may include porous air filter elements such as those used in automobile engines, air conditioners and the like. Also suitable are filter devices of centrifugal, spin-off, electrostatic and hydraulic types.

In the operation of collector 10, wet or dry waste material will gradually fill hopper 11 until the material reaches the level of plunger 20a of automatic shut-off control apparatus 20 (FIG. 4). As plunger 20a is contacted and displaced upward by waste material, a shut-off switch (not shown) is actuated to turn off motor 15. With motor 15 off, vacuum adherence of collector 10 to hopper 11 diminishes and collector 10 may be separated from the hopper.

In addition to mounting on a portable hopper 11 as shown in FIG. 1, collector 10 of the present invention may be mounted in a manner represented in FIG. 2, upon a permanently positioned collector bin 11a. Bin 11a would normally be provided with a discharge gate 11b for removal of collected waste materials from the bin. Gate 11b would, of course, be adapted for airtight closure to bin 11. Collector 10, so mounted, may be connected to a plant-wide network of conduits and collector hoses, thus serving as a centralized collector for an entire facility.

Obviously, modifications and variations of the above described invention may be made without departing from the spirit and scope thereof. Therefore, only such limitations as are indicated in the appended claims shall be placed thereon.

What is claimed is:

1. A portable, heavy-duty three stage vacuum collector for use with a material collection hopper in the sequential removal of heavier, residual, and most finely divided airborn particulate material from an airstream, said collector comprising:
   a platform base;
   means for mounting said base in airtight relation atop said material collection hopper;
   blower means on said base;
   a cyclone separator first stage mounted on said base, said first stage including,
   a. inlet and outlet ports for respectively receiving a stream of air and airborn particulate material, and withdrawing an exhaust stream of air, and
   b. means, in open communication through said base, for substantially separating said heavier particulate material from said stream and directing said heavier material toward said collection hopper;

a particulate material accelerator second stage mounted on said base immediately adjacent said cyclone separator first stage, said second stage including,
a. a substantially vertically extending nozzle means having one end communicating with said outlet port for receiving said airstream and accelerating said particulate material in said airstream,
b. chamber means vertically disposed below said nozzle means, for receiving said airstream and particulate material accelerated by said nozzle means,
c. orifice means at the top end of said chamber means, disposed beneath said nozzle means, for permitting entry into said chamber means from said nozzle means of said airstream and particulate material accelerated by said nozzle means, and permitting exit of said air-stream from said chamber means;
d. means at the bottom end of said chamber means, in communication through said base, for substantially separating said residual particulate material from the exhaust stream of said cyclone separator first stage and directing it toward said collection hopper,
e. closure means associated with said last recited separating and directing means,
f. means mounting said closure means for movement between an open position, which permits passage of said separated residual particulate material into said collection hopper, and a closed position in which such passage is prevented, and
g. means, responsive to operation of said blower, for urging said closure means to said closed position when said blower is blowing and to said open position when said blower is not blowing;

a vertical channel having an upper end thereof for receiving said airstream exiting from said orifice means, including means for directing said airstream downwardly within said vertical channel toward an exit bottom end thereof;

an air permeable particulate material-entrapping third stage mounted on said base immediately adjacent said particulate material accelerator second stage, said third stage including,
a. an air filter chamber having a lower air inlet end and an upper air exhaust end;
b. a filter element mounted in said filter chamber;
c. means communicating said vertical chamber bottom end to the lower air inlet end of said filter chamber for receiving said airstream from said vertical channel bottom and exit;
d. means at the bottom end of said filter chamber, in communication through said base, for substantially separating the most finely divided of said particulate material from the exhaust stream of said particulate material accelerator second stage and directing said separated particulate material toward said collection hopper;
e. closure means associated with said last-recited separating and directing means,
f. means mounting said closure means for movement between an open position, which permits passage of said separated most finely divided particulate material into said collection hopper, and a closed position in which such passage is prevented, and
g. means, responsive to operation of said blower, for urging said closure means to said closed position when said blower is blowing and to said open position when said blower is not blowing, said blower means being in communication with said first, second and third stages for drawing into said first stage a stream of air and airborn particulate material and exhausting from said third stage a stream of air from which said particulate material has been substantially separated.

2. A collector as set forth in claim 1 wherein:
said means responsive to operation of said blower for urging said closure means of said accelerator second stage to said closed position comprises means responsive to an air pressure differential between said collection hopper and said accelerator second stage;
and said blower means further comprises means for developing said pressure differential.

3. A collector as claimed in claim 2 wherein:
said means responsive to operation of said blower for urging said closure means of said particulate material-entrapping third stage to said closed position comprises means responsive to an air pressure differential between said collection hopper and said material-entrapping third stage;
and said blower means further comprises means for developing said pressure differential.

4. A collector as set forth in claim 1 wherein:
said means for mounting said base in airtight relation atop said hopper includes means for raising and lowering said base.

5. A collector as set forth in claim 4, wherein:
said means for raising and lowering said base includes pneumatically inflating and deflating bellow means for raising said platform base away from said hopper when said bellow means are inflated and for lowering said platform base toward said hopper when said bellow means are deflated.

6. A collector as claimed in claim 1 wherein said platform base includes channel means for receiving the tines of fork-lift equipment.

7. A collector as claimed in claim 1 wherein:
said vertical channel exit bottom end and said air filter chamber lower inlet end include means for communicating the airstream at said lower end of said vertical channel in a direction reversal flow from downwardly directly out of said channel to immediately upwardly as said airstream is received into said air filter chamber.

8. A collector as set forth in claim 1 wherein:
said blower means includes positive displacement blower means.

9. A collector as set forth in claim 1 further including:
switch means for automatically shutting off said blower means upon the filling of said hopper with collected particulate material.

10. A portable, heavy-duty three stage vacuum collector apparatus for the sequential removal of heavier, residual, and most finely divided airborn particulate material from an airstream, said collector comprising:
a platform base;
a material collection hopper;
means for mounting said base in airtight relation atop said material collection hopper;
blower means on said base;

a cyclone separator first stage mounted on said base, said first stage including,
a. inlet and outlet ports for respectively receiving a stream of air and airborn particulate material, and withdrawing an exhaust stream of air, and
b. means, in open communication through said base, for substantially separating said heavier particulate material from said stream and directing said heavier material into said collector hopper;

a particulate material accelerator second stage mounted on said base immediately adjacent said cyclone separator first stage, said second stage including,
a. a vertically extending nozzle means having one end communicating with said outlet port for receiving said airstream and accelerating said particulate material in said airstream,
b. chamber means vertically disposed below said nozzle means, for receiving said airstream and particulate material accelerated by said nozzle means,
c. orifice means at the top end of said chamber means, disposed beneath said nozzle means, for permitting entry into said chamber means from said nozzle means of said airstream and particulate material accelerated by said nozzle means, and permitting exit of said airstream from said chamber means;
d. means at the bottom end of said chamber means, in communication through said base, for substantially separating said residual particulate material from the exhaust stream of said cyclone separator first stage and directing it toward said collection hopper,
e. closure means associated with said last recited separating and directing means,
f. means mounting said closure means for movement between an open position, which permits passage of said separated residual particulate material into said collection hopper, and a closed position in which such passage is prevented, and
g. means, responsive to operation of said blower, for urging said closure means to said closed position when said blower is blowing and to said open position when said blower is not blowing;

a vertical channel having an upper end thereof for receiving said airstream exiting from said orifice means, including means for directing said airstream downwardly within said vertical channel toward an exit bottom end thereof;

an air permeable particulate material-entrapping third stage mounted on said base immediately adjacent said particulate material accelerator second stage, said third stage including,
a. an air filter chamber having a lower air inlet end and an upper air exhaust end;
b. a filter element mounted in said filter chamber;
c. means communicating said vertical chamber bottom end to the lower air inlet end of said filter chamber for receiving said airstream from said vertical channel bottom end exit;
d. means at the bottom end of said filter chamber, in communication through said base, for substantially separating the most finely divided of said particulate material from the exhaust stream of said particulate material accelerator second stage and directing said separated particulate material toward said collection hopper;
e. closure means associated with said last-recited separating and directing means,
f. means mounting said closure means for movement between an open position, which permits passage of said separated most finely divided particulate material into said collection hopper, and a closed position in which such passage is prevented, and
g. means, responsive to operation of said blower, for urging said closure means to said closed position when said blower is blowing and to said open position when said blower is not blowing, said blower means being in communication with said first, second and third stages for drawing into said first stage a stream of air and airborn particulate material and exhausting from said third stage a stream of air from which said particulate material has been substantially separated.

11. Collector apparatus as set forth in claim 10 wherein said platform base includes channel means for receiving the tines of fork-lift equipment.

* * * * *